United States Patent
Wilson et al.

(10) Patent No.: US 10,039,021 B2
(45) Date of Patent: Jul. 31, 2018

(54) PROCESSING OF PASSIVE INTERMODULATION DETECTION RESULTS

(71) Applicant: AceAxis Limited, Harlow (GB)

(72) Inventors: Fiona Wilson, Harlow (GB); Simon Gale, Harlow (GB); David Damian Nicholas Bevan, Harlow (GB); Stephen Cooper, Harlow (GB)

(73) Assignee: ACEAXIS LIMITED, Harlow (GB)

( * ) Notice: Subject to any disclaimer, the term of this patent is extended or adjusted under 35 U.S.C. 154(b) by 0 days.

(21) Appl. No.: 14/722,508

(22) Filed: May 27, 2015

(65) Prior Publication Data

US 2015/0350940 A1 Dec. 3, 2015

(30) Foreign Application Priority Data

May 29, 2014 (GB) .................................. 1409523.6

(51) Int. Cl.
*H04W 24/08* (2009.01)
*H04B 1/10* (2006.01)
*H04W 52/24* (2009.01)

(52) U.S. Cl.
CPC .......... *H04W 24/08* (2013.01); *H04B 1/1027* (2013.01); *H04W 52/243* (2013.01)

(58) Field of Classification Search
CPC .............................. H04B 1/1027; H04L 1/206
See application file for complete search history.

(56) References Cited

U.S. PATENT DOCUMENTS

| | | | | |
|---|---|---|---|---|
| 2003/0232600 | A1* | 12/2003 | Montgomery | H01Q 1/246 455/67.11 |
| 2009/0086864 | A1* | 4/2009 | Komninakis | H04B 1/10 375/346 |
| 2012/0295558 | A1* | 11/2012 | Wang | H04B 1/109 455/79 |
| 2013/0310023 | A1* | 11/2013 | Bevan | H04B 1/1027 455/423 |
| 2013/0322395 | A1 | 12/2013 | Kazmi et al. | |
| 2014/0153418 | A1 | 6/2014 | Hariharan et al. | |
| 2014/0378067 | A1* | 12/2014 | Au | H04W 24/08 455/67.11 |

(Continued)

FOREIGN PATENT DOCUMENTS

GB    2502281 A    11/2013

*Primary Examiner* — David Oveissi
(74) *Attorney, Agent, or Firm* — EIP US LLP

(57) ABSTRACT

A PIM (passive intermodulation) diagnosis is generated for one or more wireless networks which have equipment deployed at a plurality of cell sites. Data is received representing PIM detection results from PIM detection devices at the cell sites, the detected PIM including PIM caused by passive intermodulation between carriers of the one or more wireless networks. The data representing respective PIM detection results is normalized to account for transmission power and frequency allocation of respective cell sites, and the normalized data representing respective PIM detection results is correlated with data relating to a condition of respective cell sites and/or an environment of the respective cell sites to produce correlation results. The PIM diagnosis is generated in dependence on the correlation results.

20 Claims, 14 Drawing Sheets

(56) References Cited

U.S. PATENT DOCUMENTS

| | | | |
|---|---|---|---|
| 2015/0087242 A1* | 3/2015 | Bain | H04B 1/1027 455/73 |
| 2015/0091755 A1* | 4/2015 | Chawgo | H01Q 3/04 342/359 |
| 2015/0145528 A1* | 5/2015 | Yeo | G01R 29/10 324/629 |

* cited by examiner

PROCESSING OF PASSIVE INTERMODULATION DETECTION RESULTS

CROSS-REFERENCE TO RELATED APPLICATIONS

This application claims priority to United Kingdom Patent Application No. GB 1409523.6, filed May 29, 2014, the entire disclosure of which is hereby incorporated by reference.

BACKGROUND OF THE INVENTION

Field of the Invention

The present application relates generally to detection of interference due to passive intermodulation (PIM) products of transmitted signals in a wireless network or networks, and more specifically, but not exclusively, to generating a diagnosis from PIM detection results for a plurality of cell sites, the diagnosis comprising a likely cause of PIM in the network and/or predictions of a likelihood of experiencing PIM in the network or networks.

Description of the Related Technology

Passive intermodulation products may be generated in a wireless network when two or more signals are transmitted at different frequencies along a signal path including a passive (unpowered) device having a non-linear transmission characteristic; these products differ in frequency from the signals from which they were generated, and may potentially cause interference to other signals. The generation of passive intermodulation products is becoming a problem of increasing importance in modern wireless communication systems, and in particular cellular wireless systems, since the radio frequency spectrum available has been steadily expanded as additional bands have become available, and the pattern of allocation of uplink and downlink bands within the available spectrum for use by various cellular systems, such systems using GERAN (GSM EDGE Radio Access Network), UTRAN (UMTS Terrestrial Radio Access Network) and E-UTRAN (Evolved UMTS Terrestrial Radio Access Network) radio access networks, and by various operators, is complex and territorially dependent. In this environment, and in particular at a cellular radio base station at a cell site, it is likely that circumstances arise in which passive intermodulation products generated from transmitted carriers in one or more downlink bands would fall within an uplink band in which signals are received at the base station. Intermodulation generated by non-linear characteristics of active components such as power amplifiers may generally be dealt with at a design stage by appropriate frequency management and filtering, but intermodulation caused by non-linear characteristics of passive components, so called passive intermodulation (PIM), may prove more difficult to manage. Many passive components may exhibit a non-linear transmission characteristic to some degree, for example due to an oxide layer at a metal to metal contact, and the non-linear characteristic may develop with time as an ageing process of the component. Furthermore, PIM may be caused by components in the signal path between the transmitter and the receiver that are external to the active transceiver equipment and which may be outside the operator's control, such as metallic objects on the antenna tower or other objects in the signal path through the propagation environment, such as fences; this is known as the "rusty bolt" effect. PIM may also be caused in passive components, such as antennas or diplexers, which are external to the active transmitter and receiver equipment.

Interference due to PIM received at an incoming signal receiver, typically at a base station such as an eNodeB located at a cell site, may be detected by a PIM detection device, as described in UK patent application GB1208921.5. However, if a PIM detection device detects PIM, it is difficult to diagnose likely causes of PIM at a cell site at which it is located. It is also difficult to diagnose the likelihood of PIM becoming a problem at a given cell site in the future. Furthermore, it is difficult for a wireless network operator to diagnose PIM problems across a wireless network such as a Public Land Mobile Network (PLMN) that may comprise many hundreds of cell sites covering a large geographical area, and which may comprise a variety of equipment types, subject to varying environmental conditions. In addition, it is difficult to diagnose PIM problems caused by interactions between carriers of two or more PLMNs.

SUMMARY

In accordance with a first aspect, there is provided a method of generating a PIM (passive intermodulation) diagnosis for one or more wireless networks, the one or more wireless networks comprising equipment deployed at a plurality of cell sites, the method comprising:

receiving data representing respective PIM detection results from PIM detection devices for respective cell sites, the detected PIM comprising PIM caused by passive intermodulation between carriers of the one or more wireless networks;

normalizing the data representing respective PIM detection results to account for transmission power and frequency allocation of respective cell sites;

correlating the normalized data representing respective PIM detection results with data relating to a condition of respective cell sites and/or an environment of the respective cell sites to produce correlation results; and dependent on the correlation results, generating the PIM diagnosis.

This can allow a PIM diagnosis to be generated based on PIM detection results from many cell sites across a network, based on correlations between PIM results and a condition and/or environment of cell sites. This can allow dependencies and effects to be determined that would not be apparent from analysis of data from a single cell site. Normalizing the PIM detection results allows a fair assessment of the underlying propensity of the cell site equipment and cell site external environment to generate PIM, by allowing for the effect of different carrier power and frequency scenarios on PIM detection results. This can allow a comparison of changes in the underlying propensity to generate PIM at a given cell site over time, or between cell sites, irrespective of differences in transmission power or frequency allocation of receive channels and transmitted carriers.

In an embodiment, the PIM diagnosis comprises an indication of a likely cause of PIM.

This can allow a likely cause of PIM to be identified at a given cell site, based on identified dependencies from data gathered from many cell sites across the wireless network.

In an embodiment, the PIM diagnosis comprises an indication of a likelihood of experiencing PIM at a given cell site.

This can allow a likelihood of experiencing PIM at a given cell site to be identified, based on identified dependencies from data gathered from many cell sites across the wireless network.

In an embodiment, the likelihood of experiencing PIM is the likelihood of experiencing PIM given a hypothetical condition. The hypothetical condition may comprise a change in the condition of at least one cell site, and the change in the condition of at least one cell site may comprise a change in deployed equipment, and/or a change in carrier frequency allocation and/or bandwidth.

This can allow planning of a network upgrade or cell site upgrade to take into account predicted PIM effects based on PIM detection results gathered across the wireless network.

In an embodiment, the hypothetical condition comprises a change in the environment of at least one cell site, and/or a change in a pattern of environmental variation.

This can allow a prediction of PIM effects in the event that the environment of the at least one cell site should change, and/or in the event that a pattern of environmental variation should change, for example increased extremes of temperature cycling or prolonged monsoon rain.

In an embodiment, generating the PIM diagnosis comprises: identifying from the correlation results and a hypothetical condition of a given cell site an aspect of the hypothetical condition of the given cell site that will be likely to cause PIM. For example, an equipment configuration and frequency plan could be hypothesized, and an aspect that would cause PIM may be identified.

In an embodiment, generating the PIM diagnosis comprises: identifying from the correlation results and a hypothetical environment of a given cell site an aspect of the hypothetical environment of the given cell site that will be likely to cause PIM. For example, it may be found that an increase in humidity may tend to cause PIM.

The environment of respective cell sites may comprise a meteorological condition of the respective cell sites. In an embodiment, the meteorological condition may be accumulated over time.

This can allow correlations to be identified which are dependent on longer term effects of meteorological conditions over weeks, months or years.

In an embodiment the data relating to a condition of respective cell sites comprises an equipment inventory.

This can allow evaluation of different designs of equipment deployed in the one or more wireless networks, for example antennas, in terms of PIM performance, and evaluation and comparison of the PIM performance of equipment from different manufacturers.

In an embodiment, said data representing respective PIM detection results comprises data representing respective magnitudes of received PIM at respective cell sites.

This can allow more accurate diagnosis of PIM than would a pass/fail PIM detection result based on a threshold.

In an embodiment, said normalizing comprises: determining a normalized received power of a detected PIM signal, on a basis comprising the center frequency of the detected PIM signal and the centre frequency and filter response of a receiver for a PIM detector, and/or on a basis comprising the modulation and bandwidth of the carriers causing the detected PIM, and/or on a basis comprising the transmit powers of the carriers causing the detected PIM.

The normalized received power of the detected PIM signal relates to an underlying propensity of the equipment at a cell site or the environment around a cell site to generate PIM.

In an embodiment, said correlating comprises: determining a dependency between the normalized data representing respective PIM detection results and data relating to a condition of respective cell sites and/or an environment of the respective cell sites to produce correlation results. The determination of the dependency may comprise statistical correlation, and may comprise use of a Bayesian technique.

This can allow effective determination of a dependency.

In an embodiment, the method comprises generating the PIM diagnosis at a network management node of at least one of the wireless networks, for example at an Operations System (OS) of a Telecommunication Management Network (TMN).

This can allow PIM diagnosis at a central location in the network.

In an embodiment, at least one of the wireless networks comprises equipment having a first radio access technology (RAT) and equipment having a second radio access technology, and the detected PIM comprises PIM caused by intermodulation between at least one carrier of the first radio access technology and at least one carrier of the second radio access technology.

This can allow diagnosis, which may involve prediction, of PIM associated with introducing next generation radio access technology equipment at a cell site.

In an embodiment, the detected PIM comprises PIM received below the thermal noise floor of a receiver for a PIM detection device in the wireless network.

This can allow low levels of PIM, which may not cause interference effects with received signals or cause a degradation of system performance, to be used as the basis of a diagnosis of underlying PIM conditions and dependencies. This can allow the use of a greater amount of data in determining correlations than would be possible if only PIM detection results from cases where PIM has been found to cause degraded performance were to be used.

In an embodiment, the PIM diagnosis is a prediction of future PIM above the thermal noise floor based at least on PIM detection results of PIM received below the thermal noise floor.

This can allow PIM diagnosis to be performed in a network that may not be currently suffering from degraded performance due to PIM.

In accordance with a second aspect, there is provided apparatus arranged to perform the method of any of the claims to a method.

In accordance with a further aspect, there is provided a non-transitory computer-readable storage medium comprising a set of computer-readable instructions stored thereon, which, when executed by a processing system, cause the processing system to control apparatus to carry out a method of generating a PIM (passive intermodulation) diagnosis for one or more wireless networks, the one or more wireless networks comprising equipment deployed at a plurality of cell sites, the method comprising:

receiving data representing respective PIM detection results from PIM detection devices for respective cell sites, the detected PIM comprising PIM caused by passive intermodulation between carriers of the one or more wireless networks;

normalizing the data representing respective PIM detection results to account for transmission power and frequency allocation of respective cell sites;

correlating the normalized data representing respective PIM detection results with data relating to a condition of respective cell sites and/or an environment of the respective cell sites to produce correlation results; and dependent on the correlation results, generating the PIM diagnosis.

Further features and advantages will be apparent from the following description of preferred embodiments, which are given by way of example only.

DETAILED DESCRIPTION OF CERTAIN INVENTIVE EMBODIMENTS

By way of example, embodiments will now be described in the context of detection of interference caused by passive intermodulation (PIM) and generation of a PIM diagnosis in cellular wireless networks such as GSM, 3G (UMTS) and LTE networks comprising GERAN, UTRAN and/or E-UTRAN radio access networks, but it will be understood that embodiments may relate to other types of radio access network, for example IEEE 802.16 WiMax systems.

In an embodiment, a PIM diagnosis is generated based on PIM detection results from many cell sites across a wireless network, using correlations between PIM results and conditions of cell sites, such as equipment deployment and operating conditions and environmental conditions. This can allow dependencies and effects to be determined that would not be apparent from analysis of data from a single cell site, and for the correlations to be used for PIM diagnosis. The PIM diagnosis may, for example, be an indication of a likely cause of PIM at a given cell site, based on identified dependencies from data gathered from many cell sites across the wireless network. Alternatively or in addition, the PIM diagnosis may be, for example, an indication of a likelihood of experiencing PIM at a given cell site, again based on identified dependencies from data gathered from many cell sites across the wireless network.

Figure 1:
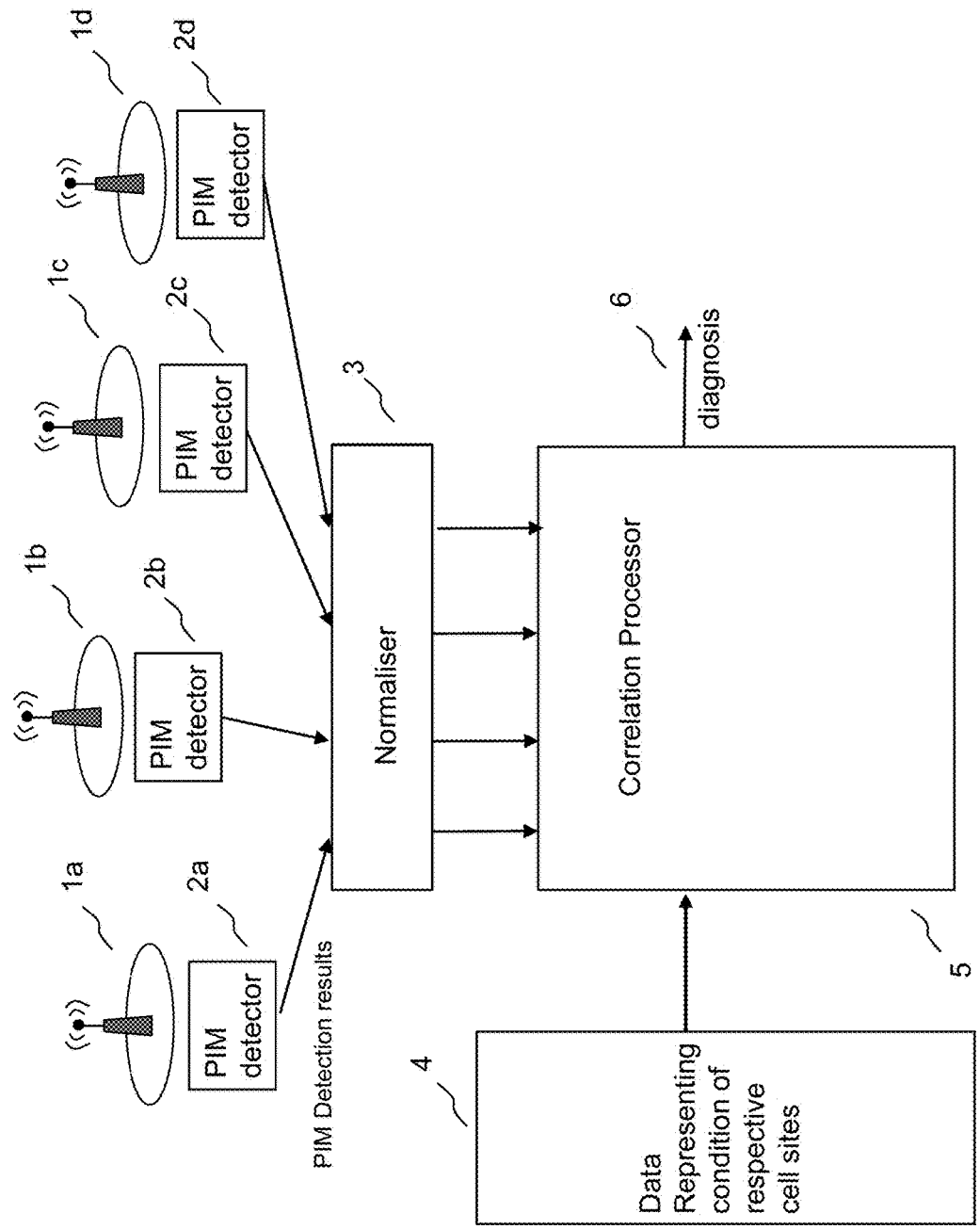
FIG. 1 is a schematic diagram illustrating an arrangement for producing a PIM diagnosis in an embodiment.

FIG. 1 shows an arrangement for generating a PIM diagnosis in an embodiment for one or more wireless networks which comprise equipment deployed at a plurality of cell sites 1a, 1b, 1c and 1d. A cell site is a physical location at which the antenna or antennas of a wireless cell or cells are installed. Typically the antenna or antennas are mounted on a tower, but a cell site could also be the location of a distributed antenna system. A cell site may be shared by equipment for more than one wireless network, for example equipment for more than one Public Land Mobile Network. For example, an antenna tower may be used to support equipment from more than one network operator. Also, a cell site may have equipment operating according to more than one radio access technology (RAT), for example UTRAN and E-UTRAN.

By contrast a node of a wireless system means a logical entity for a cell base station, such as an eNodeB (evolved Node B) that may comprise a baseband unit, radio frequency unit and antennas, but the logical entity may be distributed in terms of physical location, and not all of the logical entity may necessarily be located at the cell site. The antennas of two or more nodes may be located at the same cell site.

Figure 2:
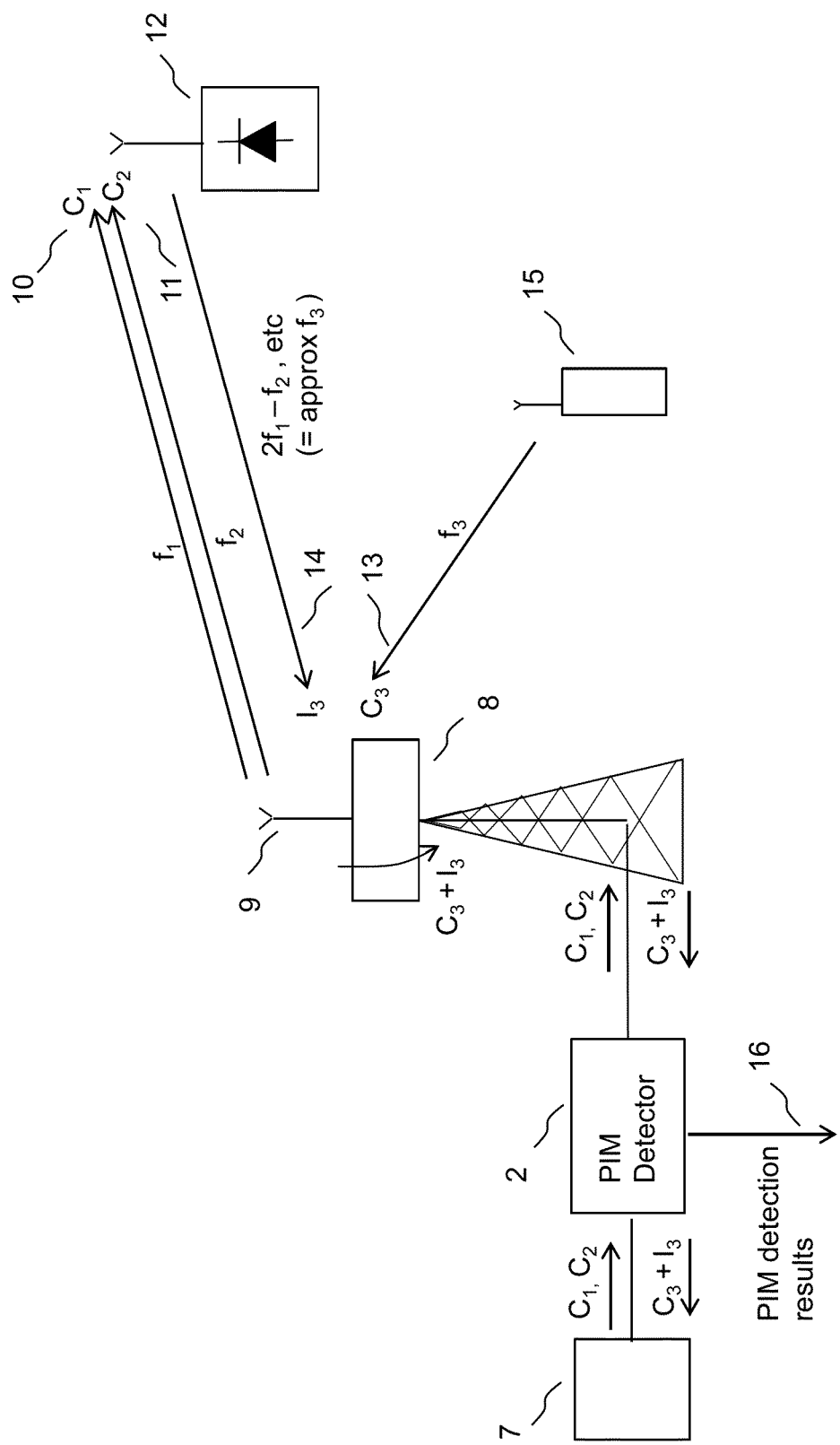
FIG. 2 is a schematic diagram illustrating generation of PIM and a PIM detection device deployed at a cell site of a wireless network in an embodiment.

PIM detection devices, also referred to as PIM detectors 2a, 2b, 2c, 2d are provided for respective cell sites. There may be more than one PIM detection device per cell site, and not all cell sites of a wireless network need have an associated PIM detector. The PIM detector may be integrated as part of the remote radio head unit 8, alternatively it need not be physically located at a cell site. For example, as shown by FIG. 2, radio signals including PIM may be received by an antenna 9 and may be downconverted and converted to digital baseband signals by a remote radio head unit 8 on an antenna tower at a cell site and the digital baseband signals may be carried, for example by a fiber, to a baseband unit 7. The baseband unit may be located at the cell site, for example in an equipment cabinet, or may be located at a different location, which may for example serve several cell sites. FIG. 2 shows that the PIM detection device 2 may be in series with the baseband link between the remote radio head 8 and the baseband unit 7. Alternatively, the PIM detection device may be integrated into the baseband unit. The PIM detection device 2 produces PIM detection results 16, for example indicating a magnitude of detected PIM. In the example shown in FIG. 2, two carriers of a wireless network 10, 11 are transmitted from the antenna 9 and impinge upon a PIM source 12, such as an oxidized metal structure. The PIM source 12 generates PIM due to intermodulation caused by its non-linear transfer characteristic, and radiates the PIM which is received at the antenna 9 as interference 14 to a received signal 13 from a user equipment 15. The received signal and the PIM are downconverted and passed to the PIM detection device 2, where the PIM is detected and PIM detection results are produced.

Returning to FIG. 1, data representing respective PIM detection results for PIM caused by passive intermodulation between carriers of one or more wireless networks is sent from PIM detection devices 2a, 2b, 2c, 2d for respective cell sites 1a, 1b, 1c, 1d, for example on a signalling channel, to a PIM diagnosis processor, typically at a central logical location in a wireless network, for example, a network management node of at least one of the wireless networks. This may, for example, be at an Operations System (OS) of a Telecommunication Management Network (TMN). The data representing PIM detection results is received by the PIM diagnosis processor, which may comprise a normalizer 3 and a correlation processor 5. The correlation processor and normalization functions may be implemented as executable code running on a computing device with associated memory and interfaces to the applicable PIM detector measurements and other data sources. Such equipment may comprise a personal computer (PC) or server that may be dedicated to this task. It may alternatively be shared with other processing tasks relating, for example, to other OSF functions. The PIM diagnosis processor may comprise one or more processors and associated memory arranged to hold executable code to cause apparatus to perform the method of embodiments.

The correlation processor may be a function that is distributed to processing elements within separate network nodes. The data representing respective PIM detection results is normalized to account for transmission power and frequency allocation of respective cell sites. The transmission power of respective cell sites may, for example, be represented in the form of a table of powers and frequencies for different RATs and PLMNs. The normalization function may be performed by the PIM detection devices, or by the processing unit, or by an intermediate device. The normalized data representing respective PIM detection results is correlated in the correlation processor 5 with data 4 relating to a condition of respective cell sites and/or an environment of the respective cell sites to produce correlation results, and a PIM diagnosis 6 is generated dependent on the correlation results.

Normalizing the PIM detection results allows a fair assessment of the underlying propensity of the cell site equipment and cell site external environment to generate PIM, by allowing for the effect of different carrier power and frequency scenarios on PIM detection results. This can allow a comparison of changes in the underlying propensity to generate PIM at a given cell site over time, or between cell sites, irrespective of differences in transmission power or frequency allocation of receive channels and transmitted carriers.

Figure 3:
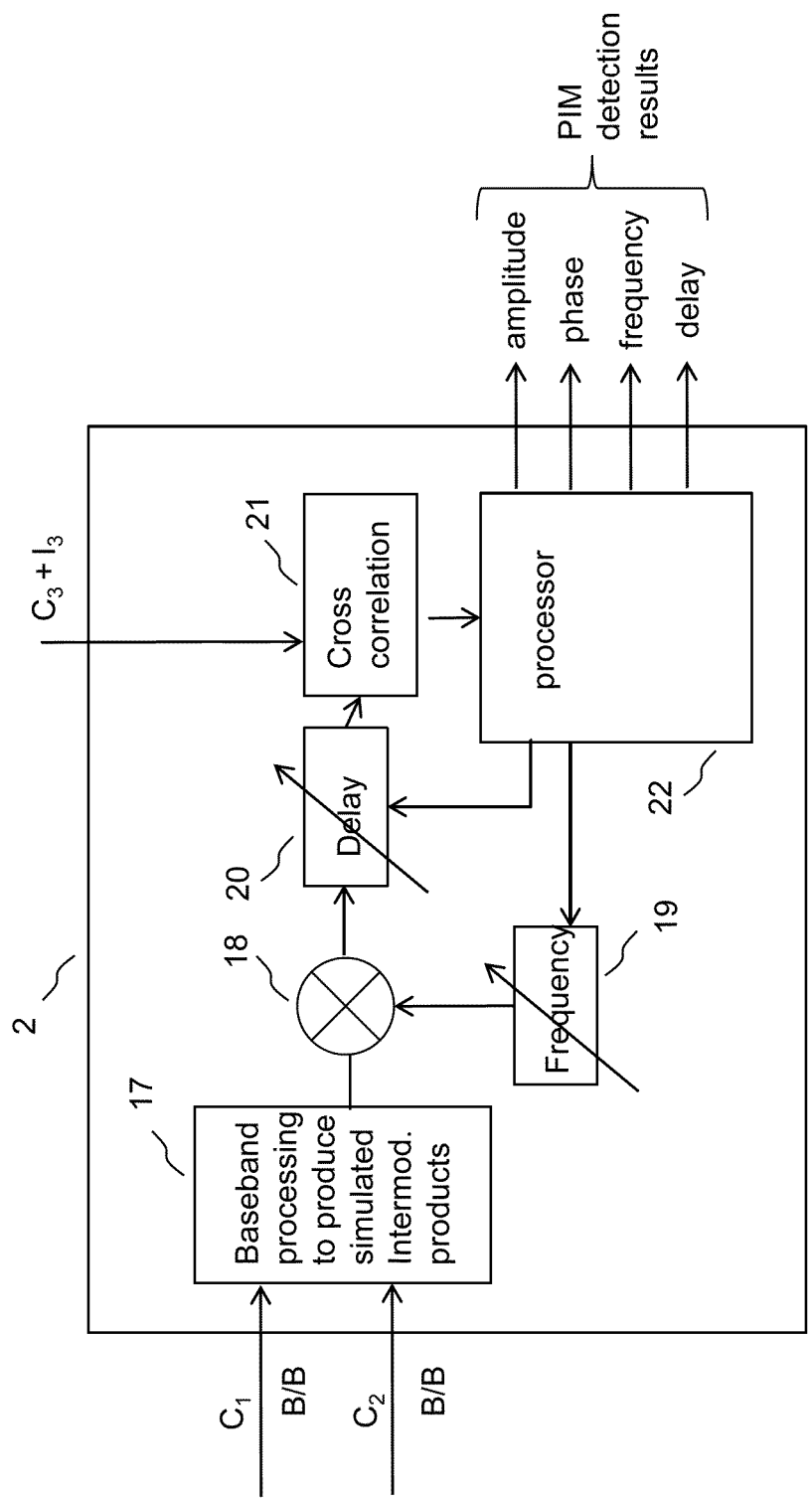
FIG. 3 is a schematic diagram illustrating operation of a PIM detection device in an embodiment.

FIG. 3 illustrates an example of the operation of a PIM detection device 2. In this example, the PIM detection device generates simulated PIM signals from samples of a first and second signal that are hypothesized to have caused PIM. The generation of the simulated PIM products in this example is carried out by baseband processing 17. Samples of the first and second signal at baseband, for example obtained from the digital data stream between a baseband unit and a radio head unit, are used to generate simulated PIM products at baseband. If the hypothesized PIM has an offset at radio frequency from the center frequency of the band used to receive PIM, then a frequency offset correction 19 may be applied, for example by a digital mixer 18. A delay 20 may also be applied, to time align the simulated time with received PIM. The simulated PIM signals are then cross-correlated using a signal processing cross-correlation operation 21. The result of the signal processing cross-correlation operation in this example is data comprising correlation magnitude as a function of time offset between the simulated PIM and a received signal, which may contain PIM. The cross-correlation may be performed for a plurality of delay values and/or frequency offset values, and a delay and/or frequency offset value may be selected, for example by a processor 22, that gives the highest correlation magnitude. The correlation magnitude gives an indication of received PIM power in the received channel of interest that was caused by intermodulation between the first and second signals with the hypothesized order of PIM. For example, third order PIM may be hypothesized, which would result in frequencies at RF of the form $2f_1-f_2$ and $2f_2-f_1$, which may fall into the receive band. Several PIM orders may be hypothesized and tested, and PIM based on several different transmitted signals may be synthesized, that would be expected to fall in a receive band of interest. PIM detection results may include data identifying the carriers causing the PIM, the magnitude of the detected PIM, and potentially the phase, offset frequency and delay of the PIM, and the order of PIM detected. Passive harmonic interference, generated as a harmonic of a single signal, may also be simulated and detected, and the PIM detection results may include passive harmonic detection results, which would be processed in the same way as is described for the PIM detection results.

Figure 4:
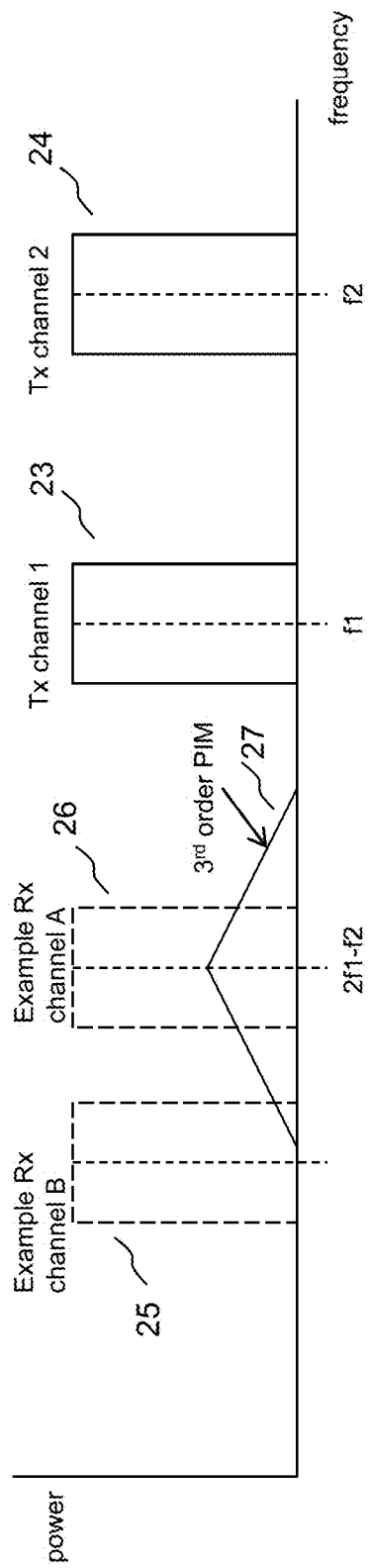
FIG. 4 illustrates transmit and receive bands in the frequency domain and a relationship of generated PIM to the receive bands.

FIG. 4 shows an example of PIM generation, shown in the frequency domain. Two transmit signals 23 and 24 generate PIM 27 which falls within a receive channel A 26. It can be seen that the PIM is a third order product, which has a broader spectrum than either of the signals from which it was generated. It can be seen that part of the PIM spectrum 27 falls into receive channel B. However, it can be seen that the amount of PIM power falling into channel B is less than that falling into channel A. The PIM detection result for channel B will therefore be lower than that for channel A. Furthermore, the PIM detection result for both channels will depend on the transmit powers of the two transmit signals 23, 24. Therefore, in order to normalize PIM detection data to indicate the underlying propensity of the PIM source to produce PIM, PIM detection results are normalized to account for transmission power and frequency allocation. The receiver for the PIM detection device may be a receiver in the remote radio head 8, which receives incoming signals and downconverts them for sending to the baseband unit 7 and/or PIM detection device 2. The receiver has a bandwidth and center frequency of reception that may affect the proportion of generated PIM that will be received, depending on the center frequency and bandwidth of the PIM. Alternatively, the PIM detector may have a dedicated antenna and receiver for receiving incoming signals including PIM.

Figure 5:
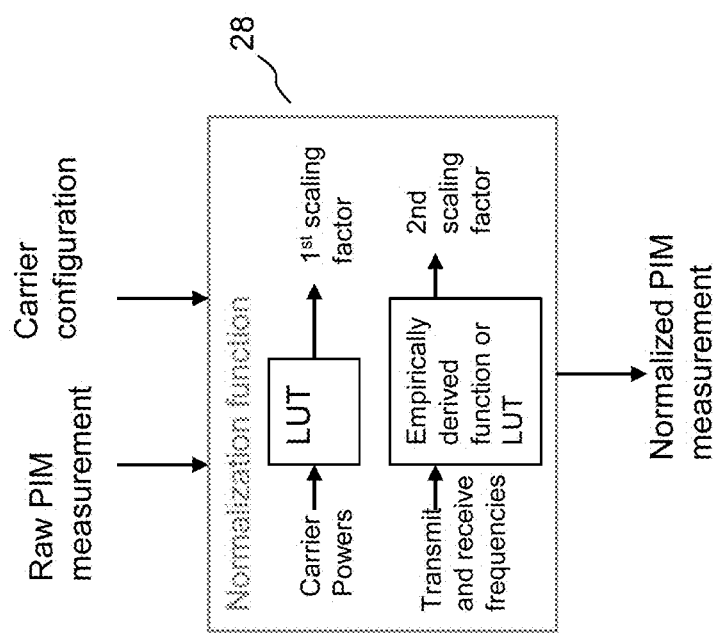
FIG. 5 illustrates a process for normalization of PIM detection results in an embodiment.

FIG. 5 shows an example of the normalization of PIM detection data in an embodiment. In this example, raw, i.e. un-normalized PIM results are scaled by a first scaling factor, for example using a look up table (LUT), to correct for the effect of transmitted signal powers, i.e. carrier power. The PIM detection results may also be scaled by a second scaling factor to correct for the relationship between transmit and receive frequencies, taking into account transmitted and received bandwidth. This may use an empirically derived function or look up table to produce the second scaling factor, which corrects for the effect whereby not all of the PIM of interest falls into the receive channel due to a frequency offset and a bandwidth limitation of the receive channel.

Figure 6:
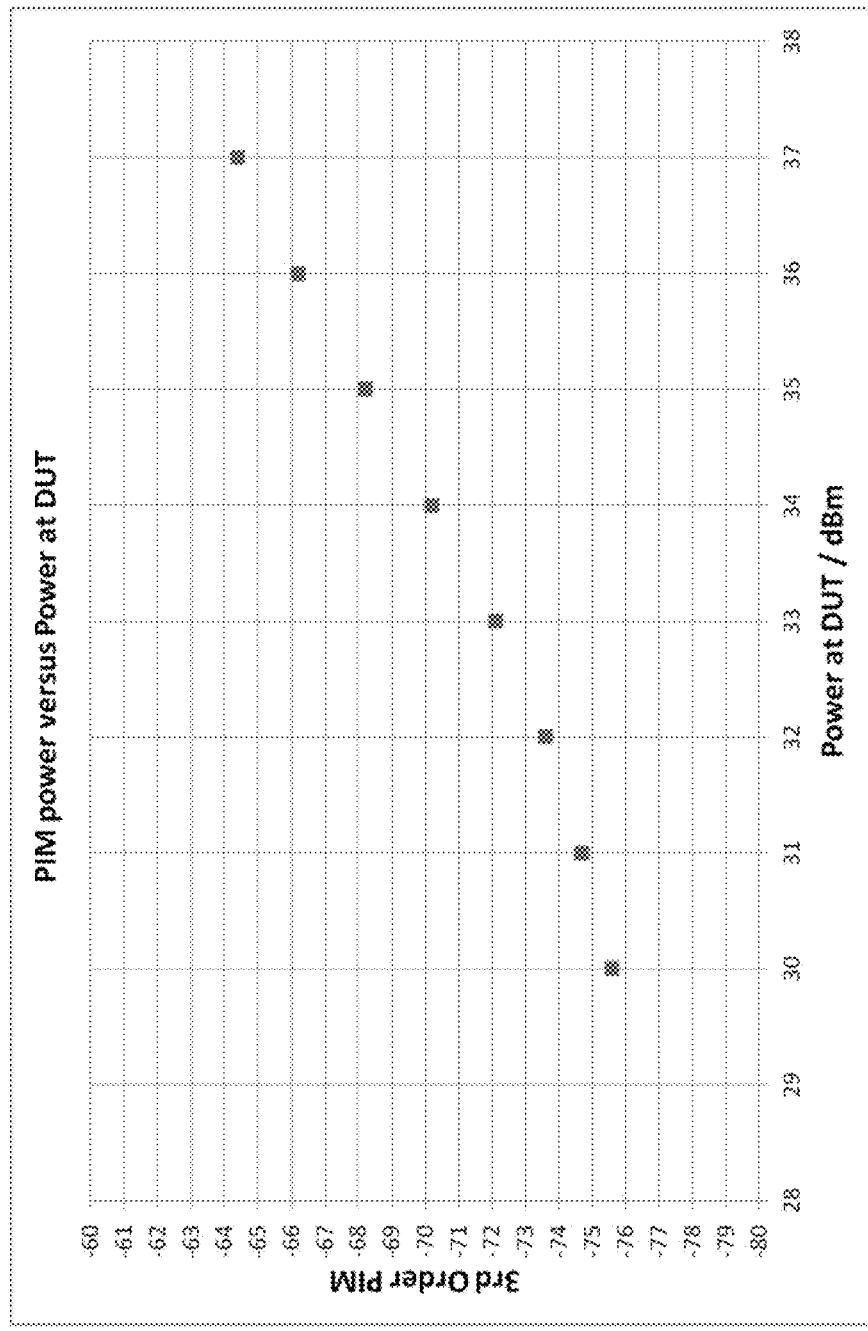
FIG. 6 illustrates a relationship between transmitted power and received PIM power.

FIG. 6 illustrates an example of a relationship between carrier power causing PIM, which is shown as power at device under test (DUT) and power of the PIM that is generated, in this example third order PIM. This relationship may be used to generate the look up table to generate the first scaling factor, or, for example, a linear approximation may be used.

Figure 7:
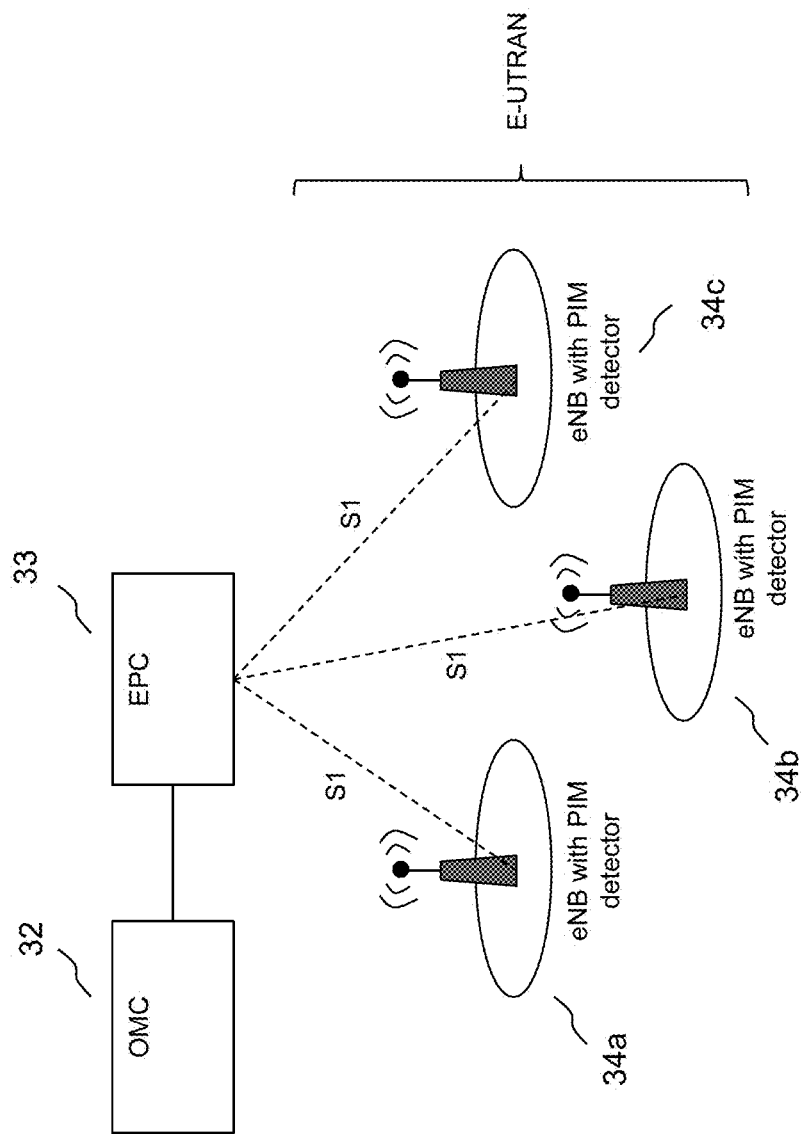
FIG. 7 illustrates examples of entities involved in PIM diagnosis in an LTE network in an embodiment.

FIG. 7 illustrates examples of entities involved in PIM diagnosis in an LTE network in an embodiment. It can be seen that eNBs (evolved Node B), which is to say LTE base station equipment for a cell, is deployed for a number of cell sites 34a, 34b, 34c and PIM detectors may be installed at the cell sites, or remote from the cell sites. PIM detection results may be signalled via Si signalling to an EPC (Evolved Packet Core) 33, and the PIM detection results may then be sent to the OMC (Operations and Maintenance Centre) 32. Operations System functions may reside in the OMC or NOC where PIM diagnoses may be made available to an operator, or to a SON (Self Organizing Networks) management system. Reporting of PIM detection results may be event driven, for example raising a flag when the PIM level has changed by a specified margin, or may be reported at regular intervals dictated by the OS (Operations System). Alternatively, the PIM detection results may be polled by the OS.

Figure 8:
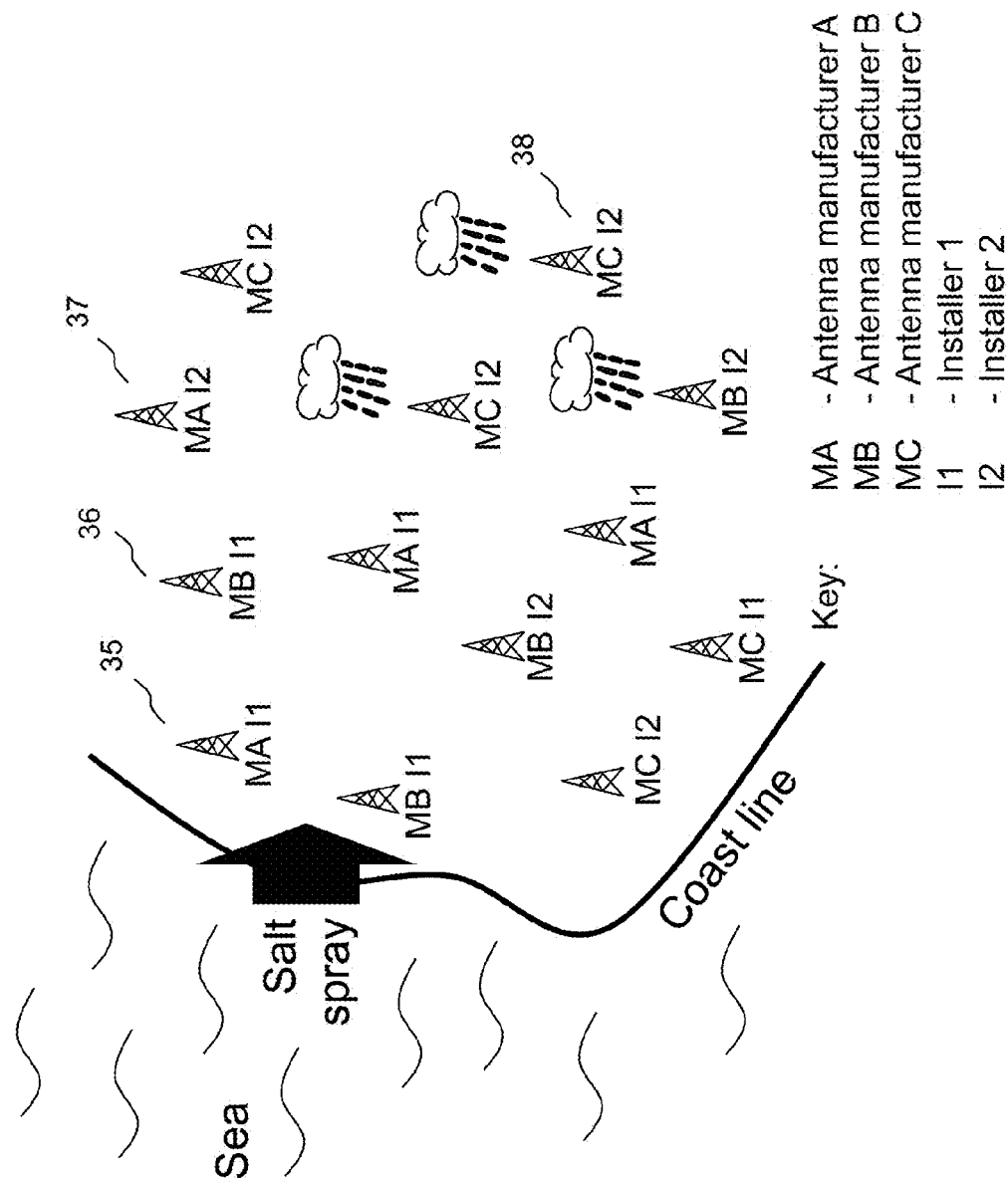
FIG. 8 illustrates a combination of equipment conditions and environmental conditions to illustrate a PIM diagnosis scenario.

FIG. 8 shows a combination of equipment conditions and environmental conditions to illustrate a PIM diagnosis scenario. A number of cell sites are deployed in a region having a coast line as shown, and salt spray may affect some cell sites more than others, potentially causing corrosion of components that may cause PIM. In the network, cell sites may have equipment, for example an antenna, from a different manufacturer, and the equipment may be installed by different installers. In the example FIG. 8, cell site 35 has equipment from manufacturer A, installed by installer 1. Cell site 36 has equipment from manufacturer B, also installed by installer 1. Cell site 37 has equipment from manufacturer A, but installed by installer 2, and cell site 38 has equipment for manufacturer C, installed by installer 2. The manufacturer and installer may be identified by equipment on an equipment inventory, and may constitute data relating to a condition of a cell site. The data may be held at a node of a network management system, or held at a cell site and reported with PIM detection results. Data representing the environment of a cell site may similarly be held at a network management system, or reported from a cell site, or obtained from some other data source. In this example, instantaneous measurements and long term averages, and determined patterns of rainfall and/or salt spray conditions may constitute the environmental data.

The PIM diagnosis may be a likelihood of experiencing PIM given a hypothetical condition. The hypothetical condition may comprise a change in the condition of at least one cell site, and the change in the condition of at least one cell site may comprise a change in deployed equipment, and/or a change in carrier frequency allocation and/or bandwidth. The diagnosis allows planning of a network upgrade or cell site upgrade to take into account predicted PIM effects based on PIM detection results gathered across the wireless network. In the example of FIG. 8, the hypothetical condition may be installing equipment from a given manufacturer, installed by a given installer in an area subject to salt spray, and having a given carrier frequency allocation and power. The diagnosis may be the likelihood of generating PIM at a given level, or an expected level of PIM for example.

The hypothetical condition may comprise a change in the environment of at least one cell site, and/or a change in a pattern of environmental variation. This can allow a prediction of PIM effects in the event that the environment of the at least one cell site should change, and/or in the event that a pattern of environmental variation should change, for example increased extremes of temperature cycling or prolonged monsoon rain.

In an embodiment, generating the PIM diagnosis may be performed by identifying from the correlation results and a hypothetical condition of a given cell site an aspect of the hypothetical condition of the given cell site that will be likely to cause PIM. For example, an equipment configuration and frequency plan could be hypothesized, and an aspect that would cause PIM may be identified. Again referring to the example of FIG. 8, it may be identified that use of a particular manufacturer's equipment may be expected to cause PIM.

Generating the PIM diagnosis may involve identifying from the correlation results and a hypothetical environment of a given cell site an aspect of the hypothetical environment of the given cell site that will be likely to cause PIM. For example, it may be found that an increase in rainfall may tend to cause change in PIM. In this case, the environment of respective cell sites may comprise a meteorological condition of the respective cell sites. In an embodiment, the meteorological condition may be accumulated over time, which may allow correlations to be identified which are dependent on longer term effects of meteorological conditions over weeks or months.

The detected PIM may comprise PIM received below the thermal noise floor of a receiver for a PIM detector in the wireless network, since the PIM detectors, which typically use a signal processing cross-correlation technique, may have the ability, by building up an accumulated correlation over time, to detect extremely low levels of PIM, much lower than would be expected to cause system degradation. For example, PIM may be detected 50 dB below the thermal noise floor of a receiver. A level of PIM at about the same level as the noise floor of a receiver may be expected to cause system degradation by causing interference with weak received signals. So, in an embodiment, low levels of PIM, which may not cause interference effects with received signals or cause a degradation of system performance, may be used as the basis of a diagnosis of underlying PIM conditions and dependencies. This can allow the use of a greater amount of data in determining correlations than would be possible if only PIM detection results from cases where PIM has been found to cause degraded performance were to be used, and PIM diagnosis may be performed in a network that may not be currently suffering from degraded performance due to PIM. For example, the PIM diagnosis may be a prediction of future PIM above the thermal noise floor based at least on PIM detection results of PIM received below the thermal noise floor.

The correlation may involve determining a dependency between the normalized data representing respective PIM detection results and data relating to a condition of respective cell sites and/or an environment of the respective cell sites to produce correlation results. The determination of the dependency may comprise statistical correlation, and may comprise use of a Bayesian technique.

In an embodiment, at least one of the wireless networks comprises equipment having a first radio access technology (RAT) and equipment having a second radio access technology, and the detected PIM comprises PIM caused by intermodulation between at least one carrier of the first radio access technology and at least one carrier of the second radio access technology. This can allow diagnosis, which may involve prediction, of PIM associated with introducing next generation radio access technology equipment at a cell site.

Figure 9:
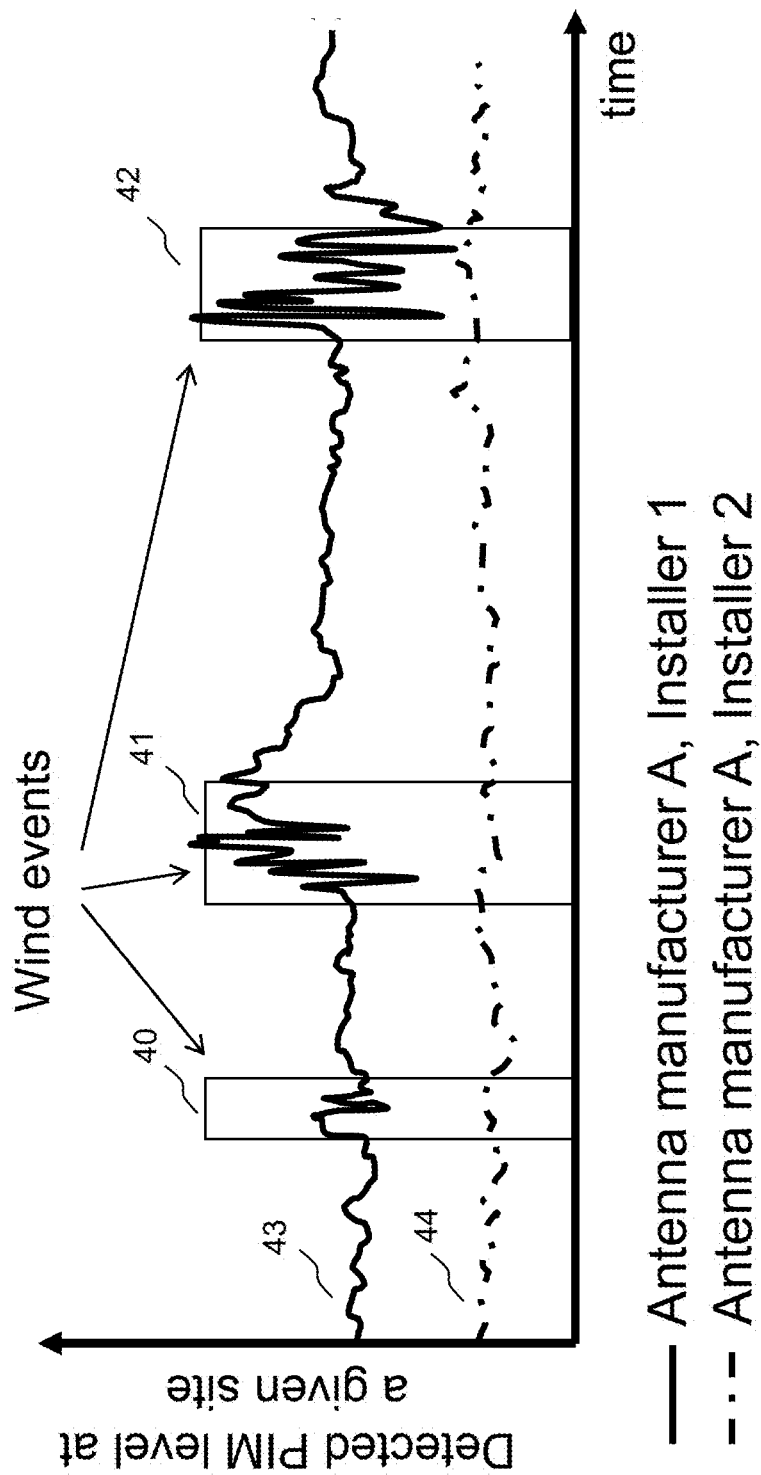
FIG. 9 illustrates an example of a short time scale behavior of detected PIM levels in the presence of wind events.

FIG. 9 illustrates an example of a short time scale behavior of detected PIM levels in the presence of wind events. Detected PIM level is shown at a given site as a function of time, for two cases, with the same manufacturer but a different installer. The first case 43 has installer 1 and the second case has installer 2, which can be identified from an inventory forming part of data relating to a condition of cell site. It can be seen that the PIM levels are generally higher during wind events 40, 41, 42, such as gusts of wind, for the first case than they are for the second case. This may be due to cable connections to an antenna not having been tightened to a correct torque by installer 1, so that there is PIM caused by vibration and stress caused by wind. A PIM diagnosis in this case, based on correlations across a number of cell sites, may be that equipment installed by installer 1 is more likely to cause PIM in windy conditions. In this case environmental data for the cell site would comprise wind speed data. This may be gathered locally to the cell site, or from a data base such as a meteorological web site. For this case the time scale of the relevant wind events may be of the order of hours up to a few days or more. There may also be longer term accumulated effects of wind. For example in some exposed environments gradual PIM degradation due to repeated wind events may be evident over months or even years. So, the environment data may relate to a period of more than an hour, more than a day, and/or more than a month.

Figure 10:
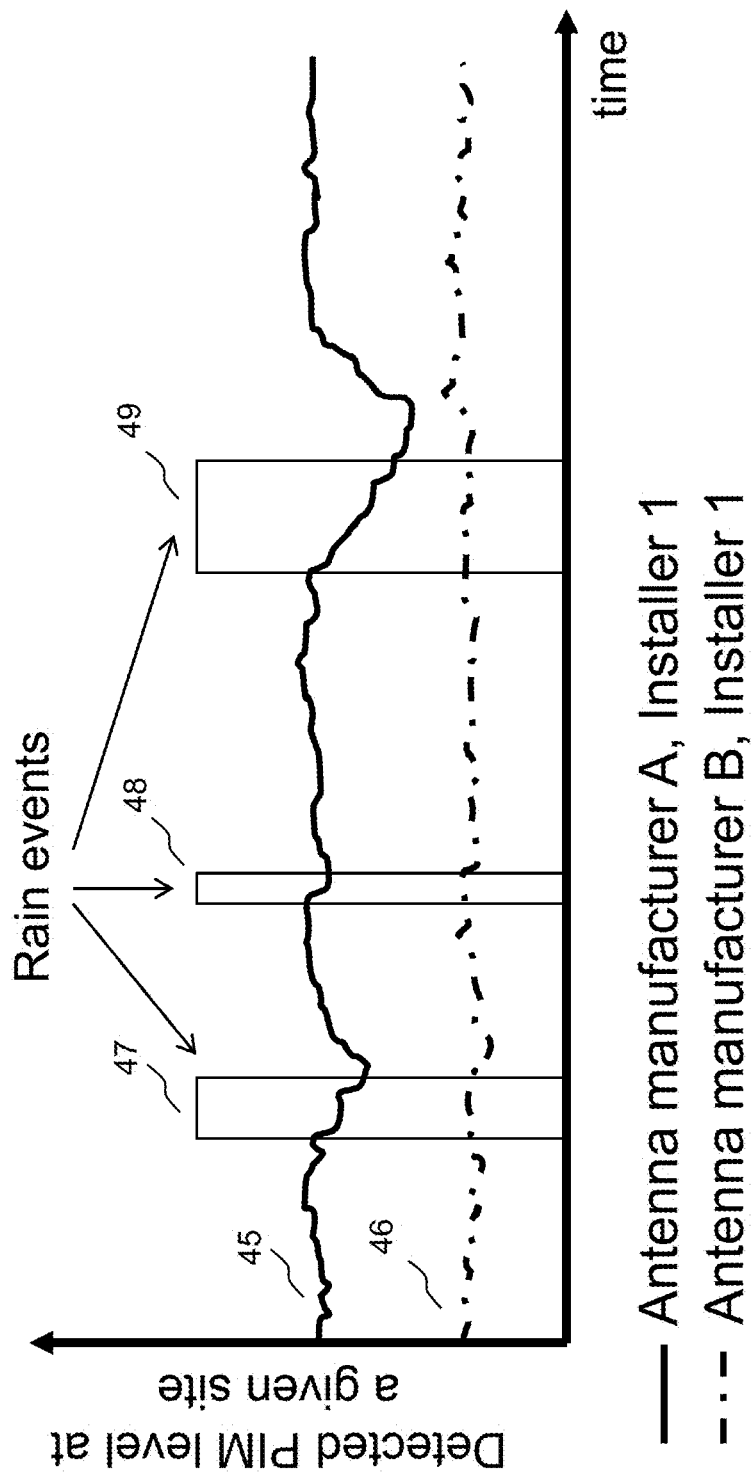
FIG. 10 illustrates an example of a short time scale behavior of detected PIM levels in the presence of rain events.

FIG. 10 shows another example of a short time scale behavior of detected PIM levels, in this case in the presence of rain events 47, 48, 49. In this example, the antennas at a cell site, connected to different PIM detectors, have different manufacturers, but in this case the same installer. The curve 45 for manufacturer A equipment shows a higher detected level of PIM, however the level is seen to reduce during periods associated with rain events, whereas the curve 46 for manufacturer B equipment shows PIM at a consistently lower level and with no dependency due to rain events. It may be diagnosed, based on correlations of PIM detection results with rain fall data for many cell sites, that equipment manufactured by manufacturer A is more susceptible to the effects of rain or humidity than equipment manufactured by manufacturer B.

Figure 11:
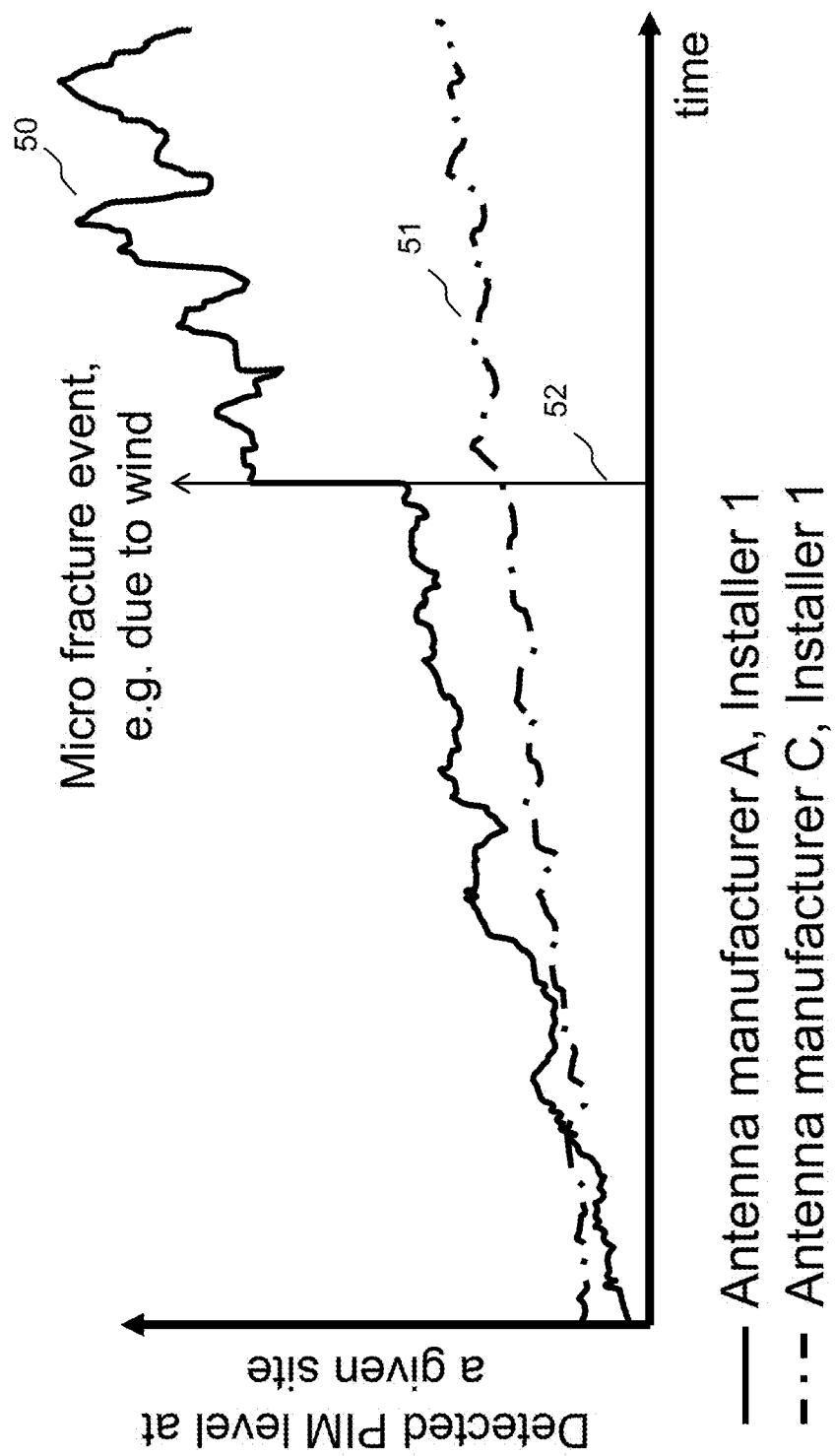
FIG. 11 illustrates an example of a long time scale increase of detected PIM levels including a fracture event due to wind.

FIG. 11 illustrates an example of a long time scale increase of detected PIM levels including a fracture event due to wind. In this case, the manufacturer A antenna, connected to a PIM detector producing an output shown by curve 50, initially provides low PIM but degrades over time, eventually suffering a fracture event 52 seriously affecting PIM performance. The effects of the fracture may not be evident from examining other aspects of the antenna performance. By contrast the manufacturer C antenna, connected to a PIM detector producing an output shown by curve 51, initially produces poorer PIM performance, but this degrades more slowly by time over periods which may be as long as more than a month or more than a year. A PIM diagnosis, which may be determined by correlation of PIM results with manufacturer over time, may be a quantification of aging effects causing PIM according to manufacturer.

Figure 12:
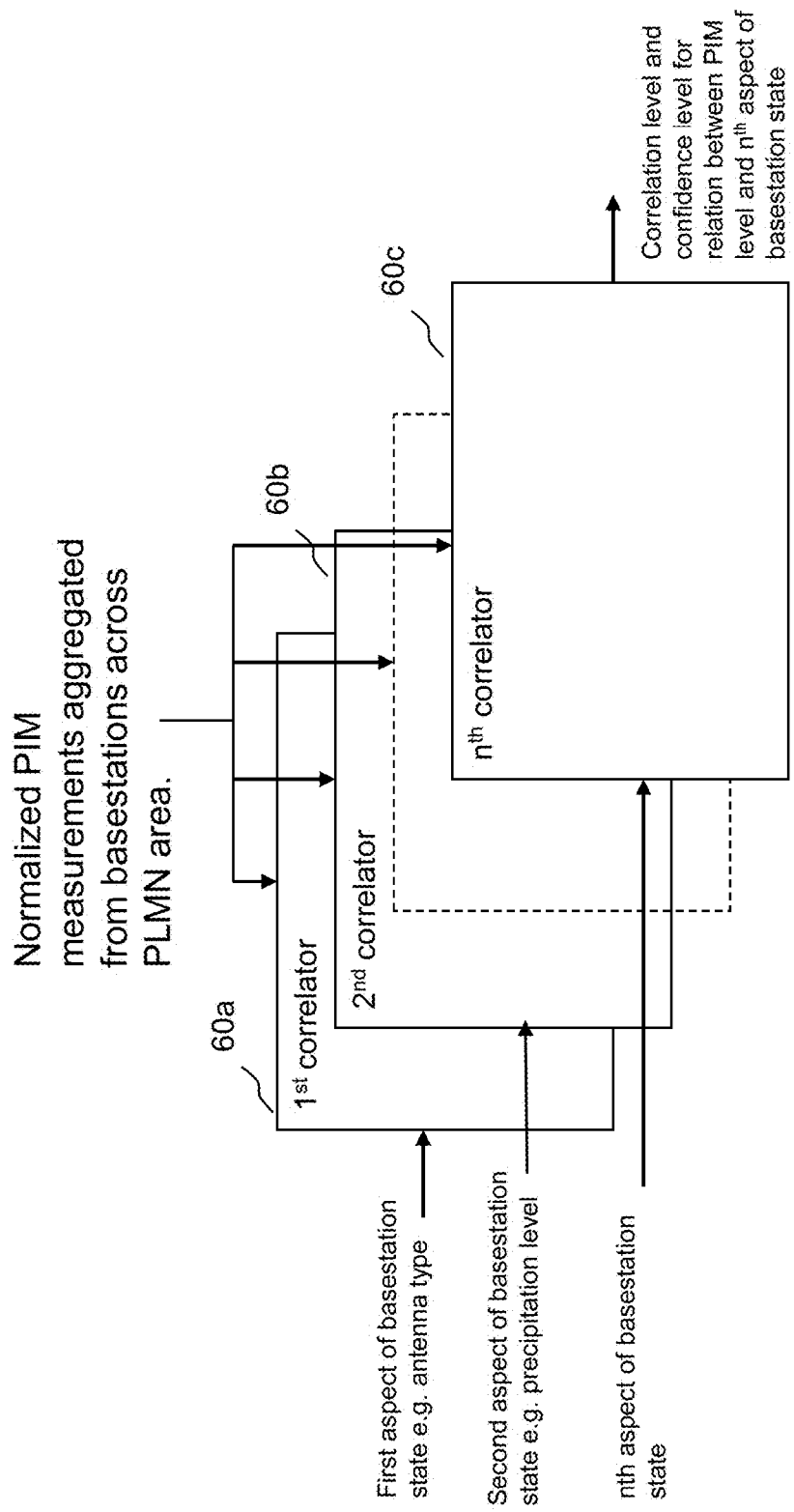
FIG. 12 illustrates a logical arrangement of processing blocks for correlating normalized PIM measurements with aspects of a condition or state of a cell site.

FIG. 12 illustrates a logical arrangement of processing blocks for correlating normalized PIM measurements with aspects of a condition or state of a cell site. This shows that, in an embodiment, processing of different aspects of the condition or environment of a cell site may be correlated with normalized PIM measurements aggregated from base stations across the area of a PLMN, or alternatively from the area of more than one PLMN.

Figure 13:
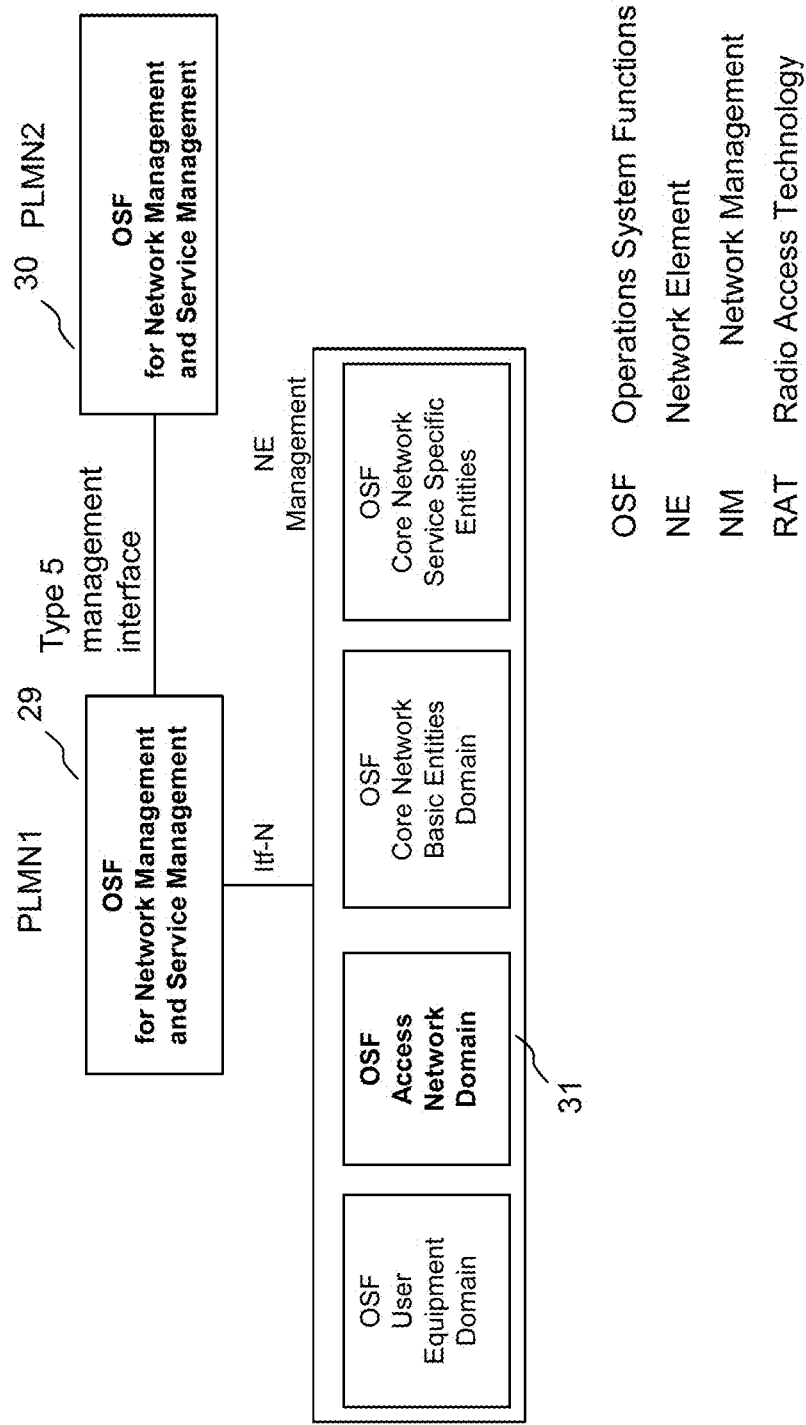
FIG. 13 illustrates an arrangement of network management domains for two wireless networks.

FIG. 13 illustrates an arrangement of network management domains for two wireless networks. This shows that Itf-N, the interface between the network element (NE) operations system functions (OSF) and network management OSFs, may be used by the network management (NM) systems to transfer PIM related management messages via the NE OSF to the Access Network OSF and transfer PIM measurements from the access network back to the NM system. The OSF 29 and the OSF access network domain 31 may provide functions for PIM diagnosis. The Access Network Domain may be multi-RAT (Radio Access Technology). As shown, PIM detection results and PIM diagnosis may be transferred between PLMNs using for example a Type 5 management interface. Alternatively the processing could be distributed through the network, allowing a node to request PIM measurements from other cell sites such that the node can correlate this data with its own measurement and thus self-diagnose PIM problems.

Figure 14:
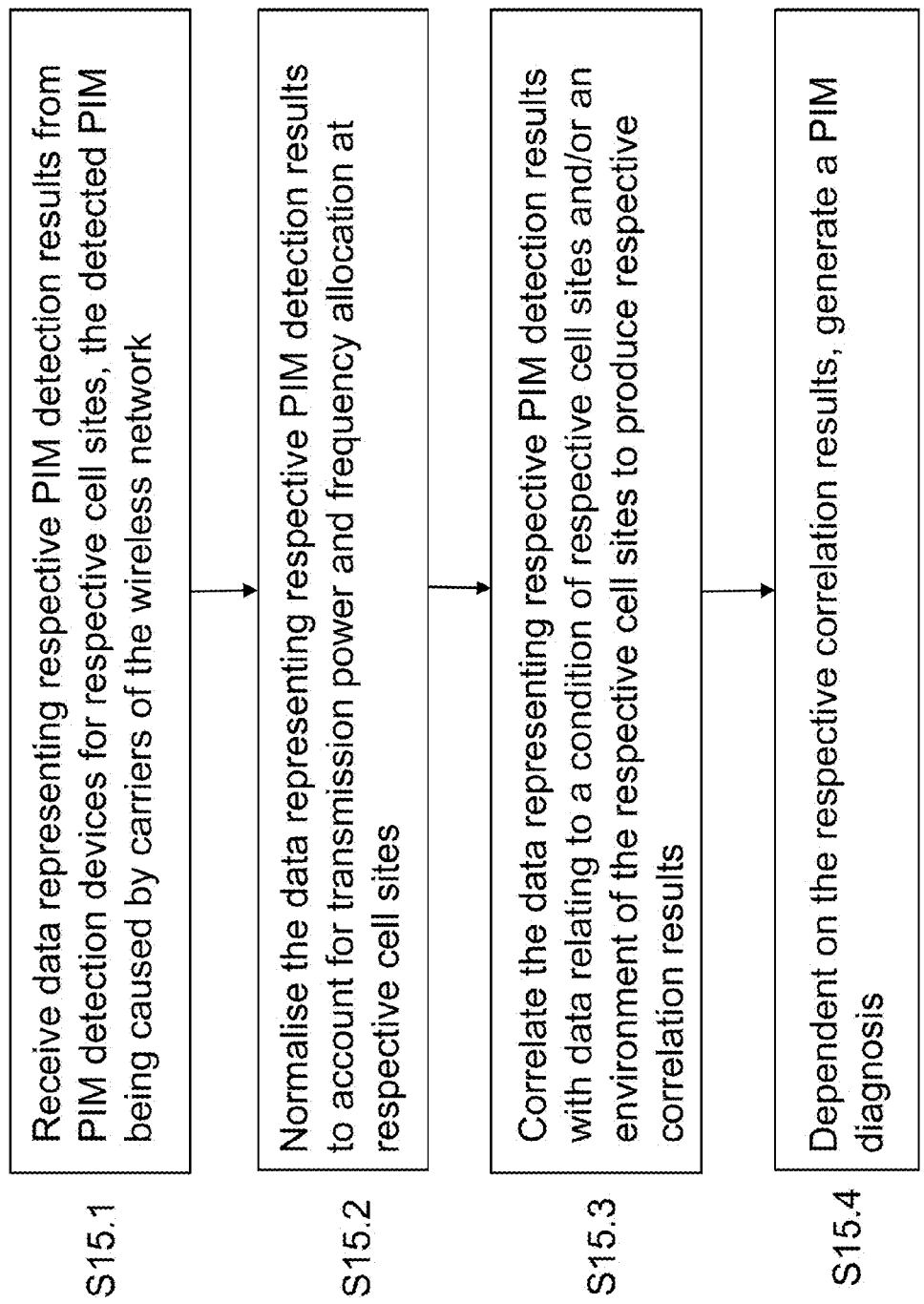
FIG. 14 is a flow diagram illustrating a method in an embodiment.

FIG. 14 is a flow diagram illustrating a method of generating a PIM diagnosis in an embodiment, according to steps S15.1, S15.2, S15.3 and S15.4.

In an embodiment, PIM measurement information, such as PIM detection results, is monitored over time from a large set of base stations, e.g. a PLMN area, and collated at some central entity, e.g. an Operations System (OS) of a TMN (Telecommunications Management Network). The measured PIM may depend upon the frequency plan of the base station and also upon the carrier levels. To allow fair comparison of the underlying PIM in different frequency and carrier power scenarios, the effect of different carrier powers and different frequency plans should be normalized out of the measurements. The normalization could be by done by look up table or an empirically derived equation. Other data about the state of each base station may also be collected. This may comprise environmental data, e.g. meteorological, or equipment data, e.g. antenna manufacturer. A number of hypotheses regarding the causes of PIM can then be tested by correlating the normalized measured PIM with one or more of the other measurements to identify possible causes of the PIM. Where the correlation is strong, the result may be flagged to the PLMN operator with a view to taking remedial action. Hypotheses may be tested using Bayesian methodology. Bayesian methods allow multiple pieces of information about the cell site state to be combined to give a prediction of the likelihood of PIM. If a single PIM measurement indicates a 'fail', given the state of the cell site and the record of strong correlations, the aspect of its state which was the most likely cause of the PIM may be identified. If a new site or site upgrade is planned, given the planned cell site state, and from the record of strong correlations, an aspect of its planned state which will be likely to cause PIM may be identified. If a site 'passes' a one off PIM test, it may be possible to predict whether it will suffer PIM given conditions other than those at the time of measurement, e.g. when it starts to rain or when it ages by 2 years. Given the future expected states of that cell site, for example known aging effects and predicted changes to the weather, in combination with aspects that are not expected to change, such as the equipment type, it may be identified from the record of strong correlations whether that cell site will suffer from PIM when it changes state. When a PIM measurement is reported, it may be normalized before it can be compared with a measurement from another site or even with previous measurements from the same site. This is because the PIM measurement is directly dependent on the frequency plan and the carrier powers. In order to make a valid comparison between the inherent PIM of two base stations it is necessary to divide the measured PIM power at the receiver for each base station by the proportion of the overall PIM that would be expected for a filter of that frequency response.

In embodiments, data representing PIM detection results may be correlated with data relating to a condition of a cell site or an environment of the cell site, which may include but is not limited to the following data: meteorological data; geographic data; data relating to installers; inventory data: equipment manufacturer, type, batch; equipment age; other equipment at a cell site, e.g. on a tower; deployment type (height above rooftop, cluttered rooftop); tower type (building, pole, mast mounted); cell traffic loading and transmit power; and use of remote electrical tilt (RET) at a cell site; network key performance indicators (KPI) (e.g. Call drops, noise rise, data rate distribution).

Data that might prove informative in making a PIM diagnoses may be categorized for example as continuous data, or as class data. Continuous data may be, for example, the age of the equipment or temperature. Class data may include some classes which are very clearly defined such as manufacturer of equipment. Other class data may have class boundaries that may be defined, for example urban, rural, and coastal deployment classes.

For continuous data, a Pearson correlation, a distance correlation and/or a Maximal Information Coefficient technique may be used for correlation between two variables such as PIM measurement and a stream of continuous data.

A Pearson correlation may identify a linear relationship between PIM and another data stream but may not identify non-linear relationships.

A distance correlation uses Euclidean distances to identify a relationship between data sets. More than a single pair of data sets may be compared by using a matrix having multiple dimensions. The result should be 0 if all sets of data are statistically independent. A distance correlation is particularly suitable for PIM diagnoses with continuous data.

Maximal Information Coefficient (MIC) is an alternative technique which may be useful for identifying a few stronger statistical dependencies out of high dimensional problems.

PIM may change for the better or worse under some conditions, for example, as the wind strengthens. To identify where this occurs, the correlation may be done with the magnitude of the distance of the PIM from the mean or using the magnitude of the time derivative of both the PIM measurement and the other data stream.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of generating a PIM (passive intermodulation) diagnosis for one or more wireless networks, the one or more wireless networks comprising equipment deployed at a plurality of cell sites, the method comprising:
   receiving respective PIM detection results from PIM detection devices for respective cell sites, each respective PIM detection result representing detection of PIM caused by passive intermodulation between carriers of the one or more wireless networks, each respective PIM detection result being obtained by correlation of respective simulated PIM signals generated from samples of at least a first signal that is hypothesized to have caused PIM with a received waveform for a respective cell site, and each respective PIM detection result comprising respective magnitudes of received PIM at respective cell sites;
   normalizing the received respective PIM detection results to account for transmission power and frequency allocation of respective cell sites;
   correlating the normalized respective PIM detection results with data relating to at least one of a condition of respective cell sites or an environment of the respective cell sites to produce correlation results; and
   dependent on the correlation results, generating the PIM diagnosis,
   wherein the normalized respective PIM detection results represent an underlying propensity of a respective cell site and its environment to generate PIM.

2. The method of claim 1, wherein the PIM diagnosis comprises an indication of a likely cause of PIM.

3. The method of claim 1, wherein the PIM diagnosis comprises an indication of a likelihood of experiencing PIM at a given cell site.

4. The method of claim 3, wherein the likelihood of experiencing PIM is the likelihood of experiencing PIM given a hypothetical condition.

5. The method of claim 4, wherein the hypothetical condition comprises a change in the condition of at least one cell site.

6. The method of claim 5, wherein the change in the condition of at least one cell site comprises a change in deployed equipment.

7. The method of claim 5, wherein the change in the condition of at least one cell site comprises a change in carrier frequency allocation and/or bandwidth.

8. The method of claim 4, wherein the hypothetical condition comprises a change in the environment of at least one cell site.

9. The method of claim 4, wherein the hypothetical condition comprises a change in a pattern of environmental variation.

10. The method of claim 4, wherein generating the PIM diagnosis comprises identifying from the correlation results and a hypothetical condition of a given cell site an aspect of the hypothetical condition of the given cell site that will be likely to cause PIM.

11. The method of claim 4, wherein generating the PIM diagnosis comprises identifying from the correlation results and a hypothetical environment of a given cell site an aspect of the hypothetical environment of the given cell site that will be likely to cause PIM.

12. The method of claim 1, wherein the environment of respective cell sites comprises a meteorological condition of the respective cell sites.

13. The method of claim 1, wherein the data relating to a condition of respective cell sites comprises an equipment inventory.

14. The method of claim 1, wherein the normalizing comprises determining a normalized received power of a detected PIM signal, on a basis comprising the centre frequency of the detected PIM signal and the centre frequency and filter response of a receiver for a PIM detection device.

15. The method of claim 1, wherein the normalizing comprises determining a normalized received power of a detected PIM signal, on a basis comprising the modulation and bandwidth of the carriers causing the detected PIM.

16. The method of claim 1, wherein the normalizing comprises determining a normalized received power of a detected PIM signal, on a basis comprising the transmit powers of the carriers causing the detected PIM.

17. The method of claim 1, wherein the correlating comprises determining a dependency between the normalized data representing respective PIM detection results and data relating to a condition of respective cell sites and/or an environment of the respective cell sites to produce correlation results.

18. The method of claim 1, wherein the detected PIM comprises PIM received below the thermal noise floor of a receiver for a PIM detection device in the wireless network.

19. The method of claim 18, wherein the PIM diagnosis is a prediction of future PIM above the thermal noise floor based at least on PIM detection results of PIM received below the thermal noise floor.

20. An apparatus for generating a PIM (passive intermodulation) diagnosis for one or more wireless networks, the one or more wireless networks comprising equipment deployed at a plurality of cell sites, the apparatus comprising:
  one or more processors and associated memory holding computer program code, the computer program code being configured to cause the apparatus to:
    receive respective PIM detection results from PIM detection devices for respective cell sites, each respective PIM detection result representing detection of PIM caused by passive intermodulation between carriers of the one or more wireless networks, each respective PIM detection result being obtained by correlation of respective simulated PIM signals generated from samples of at least a first signal that is hypothesized to have caused PIM with a received waveform for a respective cell site, and each respective PIM detection result comprising respective magnitudes of received PIM at respective cell sites;
    normalize the received respective PIM detection results to account for transmission power and frequency allocation of respective cell sites;
    correlate the normalized respective PIM detection results with data relating to a condition of respective cell sites and/or an environment of the respective cell sites to produce correlation results; and
    dependent on the correlation results, generate the PIM diagnosis,
  wherein the normalized respective PIM detection results represent an underlying propensity of a respective cell site and its environment to generate PIM.

* * * * *